Dec. 19, 1961 R. P. DIETZ 3,013,580
SERVO VALVE
Filed Sept. 10, 1959
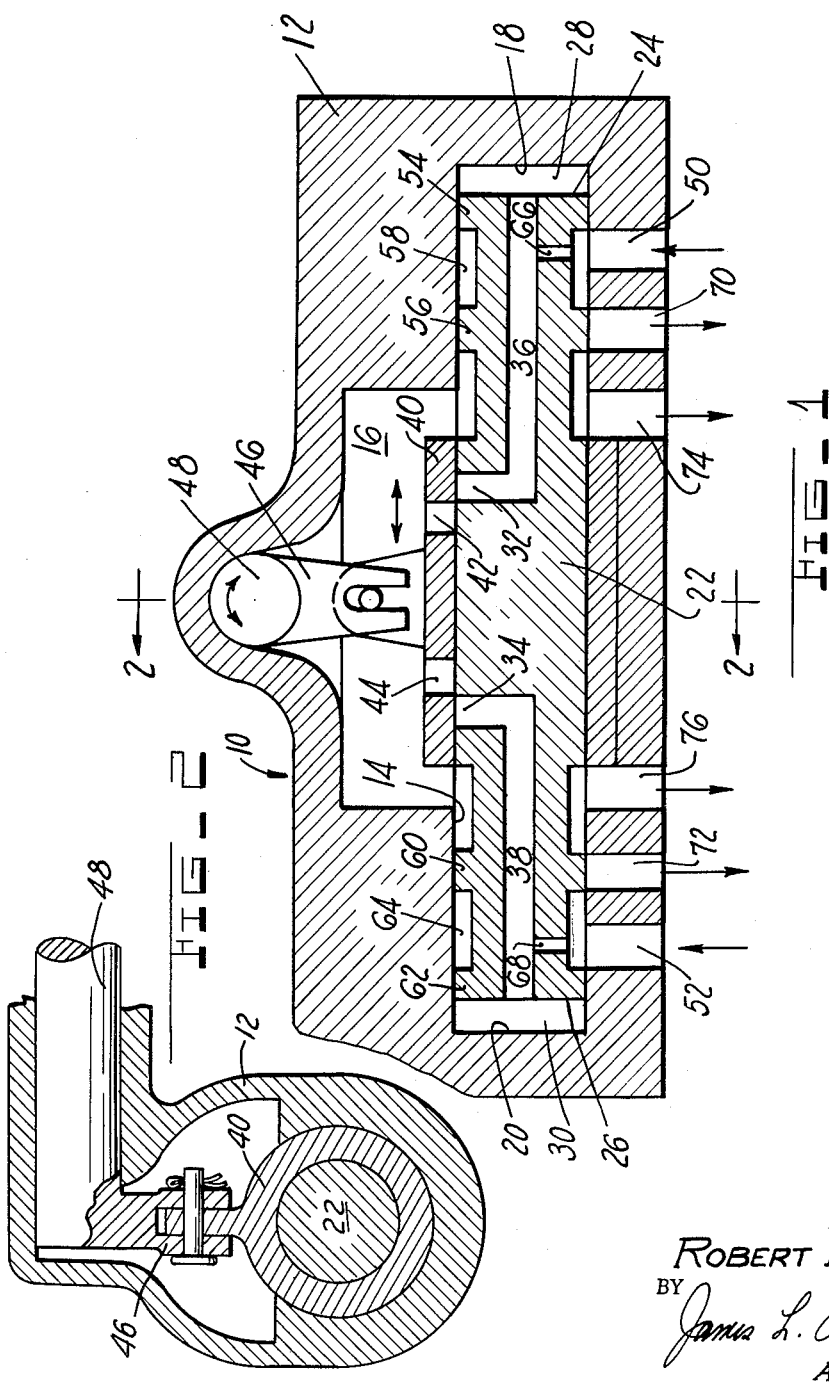
INVENTOR.
ROBERT P. DIETZ
BY
James L. O'Brien
ATTORNEY United States Patent Office 3,013,580
Patented Dec. 19, 1961

3,013,580
SERVO VALVE
Robert P. Dietz, Hamilton, Ohio, assignor to The Bendix Corporation, a corporation of Delaware
Filed Sept. 10, 1959, Ser. No. 839,186
2 Claims. (Cl. 137—622)

The present invention relates to servo valves and more particularly to such valves of the electro-hydraulic type.

It is an object of the present invention to provide a servo valve which has little or no flow therethrough when the valve is in its quiescent state.

It is a further object of the invention to provide a servo valve having a construction which may be easily and inexpensively manufactured and which is simple and reliable in operation.

These and other objects and advantages of the invention will become readily apparent from the following description taken in connection with the appended drawings wherein FIGURE 1 is a schematic view of a servo valve embodying the present invention; and FIGURE 2 is a sectional view taken along line 2—2 of FIGURE 1.

Referring now to the drawing, numeral 10 designates a servo valve having a housing 12 which is provided with a longitudinal bore or cylinder 14 having an enlarged chamber 16 formed intermediate the closed ends 18 and 20 of the cylinder. A spool valve 22 is reciprocably disposed in cylinder 14. The ends 24 and 26 of spool valve 22 respectively define together with the ends 18 and 20 of cylinder 14 first and second high pressure chambers 28 and 30. Spool valve 22 is provided with first and second axially spaced ports 32 and 34 which are respectively connected to chambers 28 and 30 by means of passages 36 and 38. A sleeve or slide valve 40 slidingly engages the circumference of spool valve 22 and is provided with first and second orifices or passages 42 and 44. In the neutral position of sleeve 40 with respect to spool valve 22, as shown in the figure, orifices 42 and 44 are closed by valve 22 so that there is no flow communication between orifices 42 and 44 and ports 32 and 34. A lever 46 is mounted on a shaft 48 which may be rotated in either direction by an appropriate electric motor or other means, not shown. Lever 46 is connected to sleeve 40 so that rotation of shaft 48 in opposite directions axially moves sleeve 40 to opposite sides of the neutral position which alternatively connects first orifice 42 with first port 32 or second orifice 44 with second port 34.

First and second inlet ports 50 and 52 are formed in housing 12 and open into cylinder 14. Valve 22 is provided with lands 54 and 56 which define therebetween an annular groove 58. At the opposite end of valve 22, lands 60 and 62 define therebetween an annular groove 64. Inlet 50 is connected to chamber 28 via annular groove 58, restricted bleed passage 66 and passage 36. Inlet 52 is connected to chamber 30 via annular groove 64, restricted bleed passage 68 and passage 38. First and second outlet ports 70 and 72 are formed in housing 12 respectively adjacent inlets 50 and 52 and open into cylinder 14. When spool valve 22 is in its neutral position as shown in the figure, land 56 prevents flow communication from first inlet 50 to the first outlet 70 and land 60 prevents flow communication from inlet 52 to outlet 72.

Housing 12 is also provided with a pair of drain passages 74 and 76 which connect chamber 16 with a source of pressure lower than inlet pressure (not shown).

In operation when the servo valve 10 is in its neutral position the position of parts is as shown in the figure. To initiate operation of the valve, shaft 48 is rotated to move sleeve 40 axially in a desired direction from the neutral position. As an example, if the slide valve 40 is moved to the right as shown in the figure, orifice 42 will be placed in communication with port 32 thereby permitting fluid from inlet 72 to flow through restricted bleed passage 66, chamber 28, passage 36, orifice 42, chamber 16 and drain passages 74 or 76 to a low pressure source. With the pressure reduced in chamber 28 due to the pressure drop across restricted bleed passage 66, inlet pressure in chamber 30 acting on the end 26 of valve 22 will urge valve 22 to the right, as viewed in the figure, thereby permitting flow communication between inlet 52 and outlet 72. Valve 22 will move to the right until port 32 is closed by sleeve 40 whereby the pressure in chamber 28 will build up to equal the pressure in chamber 30. With the pressures acting on the ends 24 and 26 of valve 22 balanced, the valve 22 will be stationary. The spool valve 22 is returned to its neutral position by axial movement of sleeve 40 to its neutral position.

Whenever sleeve 40 is in its neutral position with respect to valve 22, i.e., orifices 42 and 44 closed, there will be no flow through the valve to the drain passages 74 and 76.

While only one embodiment of my invention has been described in detail it will become readily apparent that other arrangements and modifications may be made without departing from the spirit of the invention.

I claim:

1. A servo valve comprising a housing having therein a closed ended cylinder formed with an enlarged low pressure chamber intermediate the ends of said cylinder, a spool valve reciprocably disposed in said cylinder, said spool valve having a neutral position wherein the ends of said valve together with the closed ends of said cylinder define first and second high pressure chambers, first and second axially spaced ports in said spool valve, first and second passages respectively connecting said first and second ports to first and second high pressure chambers, a sleeve encircling said spool valve and being axially movable relative to said valve, first and second axially spaced orifices in said sleeve, said sleeve having a neutral position wherein said orifices are closed by said spool valve when said valve is in its neutral position, means for moving said sleeve axially to either side of the neutral position to alternatively bring said first and second orifices into respective communication with said first and second ports, first and second inlet ports opening into said cylinder, first and second restricted passage means respectively connecting said first and second inlet ports to said first and second high pressure chambers, first and second outlet ports opening into said cylinder, first and second land means formed on said spool valve to respectively control flow communication between said first inlet and outlet ports and said second inlet and outlet ports, said land means preventing flow communication between said inlet and outlet ports when said valve is in a neutral position and alternatively establishing communication between said inlet and outlet ports when said valve is moved axially to either side of the neutral position, and means connecting said low pressure chamber to a source of pressure lower than inlet pressure.

2. A servo valve comprising a housing having a closed ended bore formed therein, an axially movable valve disposed in said bore, said valve having a neutral position wherein the ends of said valve together with the ends of said bore define first and second high pressure chambers, first and second radially opening ports formed in said valve, passage means respectively connecting said first port to said first chamber and said second port to said second chamber, a sleeve slidably mounted on said valve for axial movement relative to said valve, first and second passages in said sleeve, said sleeve having a neutral position wherein said first and second passages are closed by said valve, said first and second passages being adapted for alternative connection with said first and second ports respectively when said sleeve is moved axially on opposite sides of the neutral position of said sleeve, means for axially moving said sleeve, first and second inlet ports in said housing opening into said bore, passage means connecting said first inlet port to said first chamber, passage means connecting said second inlet port to said second chamber, first and second outlet ports formed in said housing and opening into said bore, land means formed on said valve for controlling the flow communication from said first inlet port to said first outlet port and from said second inlet port to said second outlet port, said land means being disposed to prevent communication between said inlet and outlet ports when said valve means is in neutral position and to alternatively connect said first inlet and outlet ports and said second inlet and outlet ports when said valve is moved to opposite sides of the neutral position, and means connecting said first and second passages to a source of pressure lower than inlet pressure.

No references cited.